United States Patent [19]

Wu

[11] Patent Number: 5,098,349

[45] Date of Patent: Mar. 24, 1992

[54] CHAIN

[76] Inventor: Chia L. Wu, No. 734, Chung Shan Road, Kuei Ren Hsiang, Tainan Hsien, Taiwan

[21] Appl. No.: 721,877

[22] Filed: Jun. 27, 1991

[51] Int. Cl.⁵ .............................................. F16G 13/02
[52] U.S. Cl. ................................. 474/206; 474/226
[58] Field of Search ................ 474/78, 206, 210, 212, 474/226, 228, 230, 231, 232

[56] References Cited

U.S. PATENT DOCUMENTS

| 623,431 | 4/1899 | Schaefer | 474/206 |
|---|---|---|---|
| 1,945,357 | 1/1934 | Pierce | 474/210 |
| 2,568,649 | 9/1951 | McIntosh | 474/231 |
| 3,359,815 | 12/1967 | Jeffrey | 474/231 |
| 4,102,216 | 7/1978 | Nagano | 474/231 |
| 4,265,134 | 5/1981 | Dupoyet | 474/231 |
| 4,596,539 | 6/1986 | Yamasaki | 474/206 |
| 4,642,078 | 2/1987 | Dupoyet | 474/206 |

Primary Examiner—Renee S. Luebke
Assistant Examiner—F. Saether
Attorney, Agent, or Firm—Watson, Cole, Grindle & Watson

[57] ABSTRACT

A chain is a combination of plural links. Each link comprises a first inner chain plate, a second inner chain plate, a first outer chain plate, and a second outer chain plate linked by rollers and pins. Each chain plate includes a straight waist portion disposed between two semi-circular end portions, an inner face formed with an incline extending along an edge thereof, and a blade portion merging with the incline at the straight waist portion. The first outer chain plate includes a transverse dimension greater than that of the second outer chain plate, while the first inner chain plate includes a transverse dimension greater than that of the second inner chain plate.

11 Claims, 5 Drawing Sheets

CHAIN

BACKGROUND OF THE INVENTION

This invention relates to an improved chain, especially to a chain used on a bicycle.

Typically, a multi-sprocketed bicycle has front chain rings operatively connected with a rear free wheels by a chain, being controlled by a derailleur. Referring to FIG. 7, a modern bicycle is equipped with front chain rings 8 with up to three sprockets and a rear free wheels 9 with up to seven sprockets to possibly obtain twenty-one different gear ratios to suit different road conditions. The front chain rings 8 includes front sprockets 81, 82, and 83, arranged in a diametrical sequence with the smallest diametered front sprocket 81 closest to the bicycle 7. The rear free wheels 9 includes rear sprockets 91, 92, 93, 94, 95, 96, and 97, arranged in a diametrical sequence with the largest diametered rear sprocket 97 closest to the bicycle 7. The front sprocket 83 is connected with the rear sprocket 97 by a chain (shown in a phantom line). A radius difference "a" between two adjacent front sprockets is greater than a radius difference "b" between two adjacent rear sprockets. As a result, when a rider shifts, teeth of the rear sprockets can smoothly insert into the chain, but teeth of the front sprockets cannot quickly insert into the chain.

When a rider shifts up, referring to FIG. 8, a chain with a space "A" defined by two inner chain plates or a space "B" defined by two outer chain plates is received by a tooth 920 of a larger diametered sprocket, e.g., the sprocket 92; or shifts down, referring to FIG. 9, the chain is received on a smaller diametered sprocket, e.g., the sprocket 91, suiting different road conditions, such as flat or hilly. A conventional derailleur cooperating with a traditional chain does not allow the rider to shift quickly.

Referring to FIG. 10, it is found that while the rider is shifting, a top surface of a tooth of a sprocket abuts a lateral face of the chain plate according to prior art. As a result, the sprocket can not insert immediately into the space of the chain, thus delaying the rider since he has to continuously pedal to make the sprocket engage with the chain.

In the inventor's co-pending U.S. patent application Ser. No. 07/637,293, U.S. Pat. No. 5,066,265, referring to FIG. 11, a chain link includes two outer chain plates with inwardly inclines on tops and bottoms thereof and two inner chain plates with inwardly inclines on tops and bottoms thereof, so that the sprocket can insert easily and smoothly into the space of the chain.

Although the chain in accordance with the inventor's co-pending application can quickly engage with an intended rear sprocket when shifting, it can not quickly engage with an intended front sprocket when shifting up, as the radius difference "a" between two adjacent front sprockets is larger than the radius difference "b" between two adjacent rear sprockets.

SUMMARY OF INVENTION

The present invention provides an improved chain which is a combination of a plurality of links; each link has a pair of rollers, a pair of inner chain plates, and a pair of outer chain plates. The chain plates are dumbbell-shaped with a straight waist portion disposed between two semi-circular end portions.

The pair of inner chain plates includes a first inner chain plate which is distal from the bicycle when mounted and a second inner chain plate. The first inner chain plate is wider than the second inner chain plate and provides inward inclines along a top and a bottom thereof.

The pair of outer chains includes a first outer chain plate which is distal from the bicycle when mounted and a second outer chain plate. The first outer chain plate is wider than the second outer chain plate and provides inward inclines along a top and a bottom thereof.

Thus, after combining all of the elements above-mentioned, a link of the chain will provide a curved surface, with an inlet width between two inner chain plates larger than that of a traditional chain.

Therefore, it is an object of this invention to provide a link chain that facilitates a quick engagement of a chain with a front sprocket while shifting up.

DETAILED DESCRIPTION OF THE PREFERRED EMBODIMENT

Figure 1:
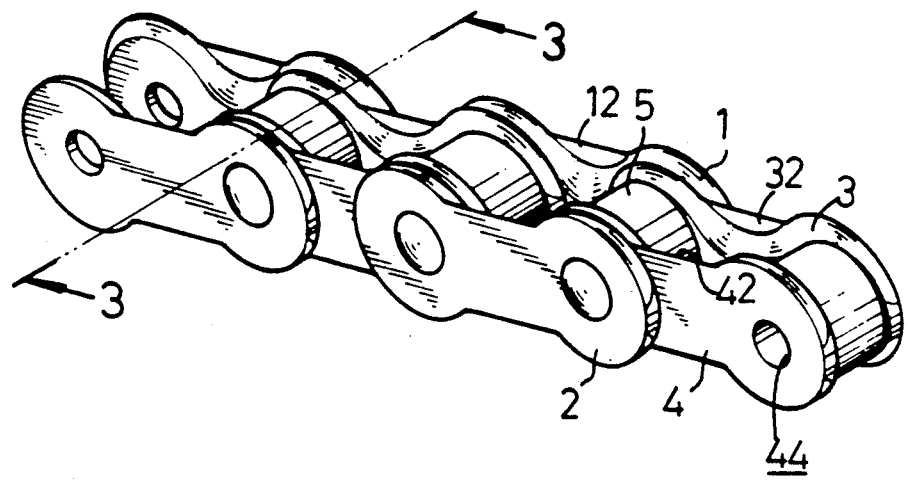
FIG. 1 is a perspective view of a segment of a chain in accordance the present invention.

Referring to FIG. 1, a segment of a chain in accordance with the present invention is seen. The chain is composed of a plurality of links.

Figure 2:
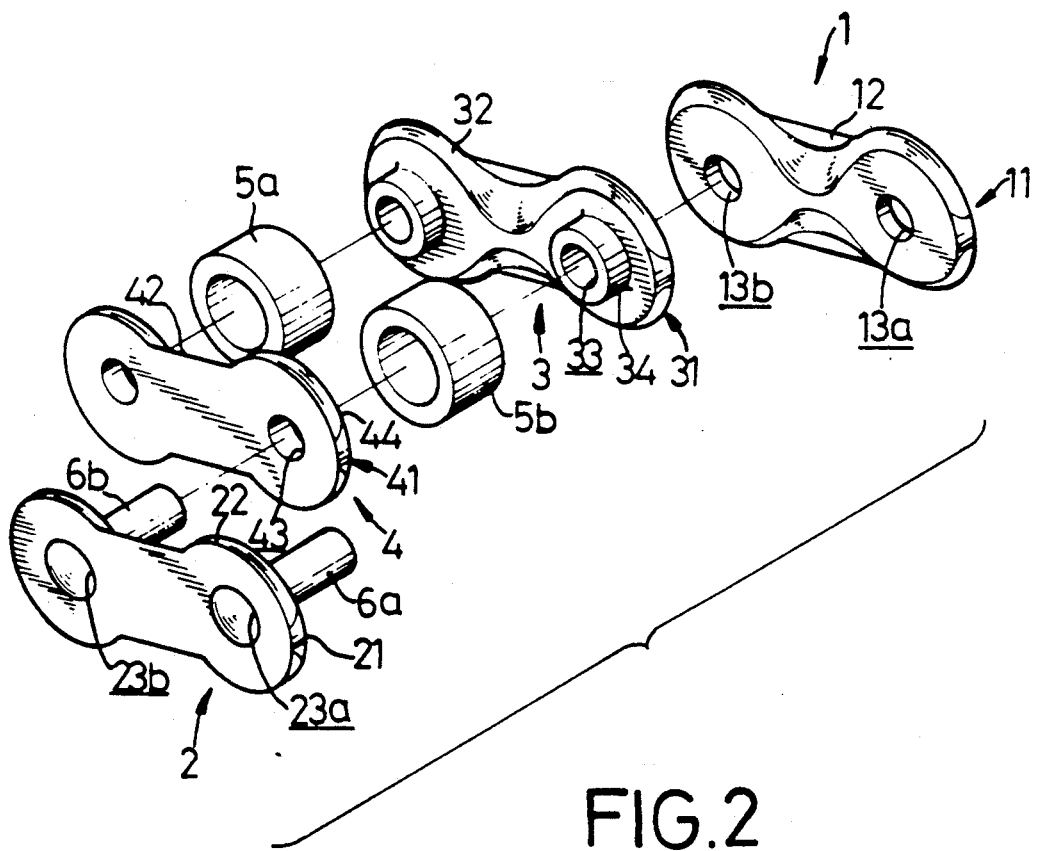
FIG. 2 is an exploded perspective view of a link of a chain in accordance with the present invention.

Referring to FIG. 2, a link of the chain includes a first outer chain plate 1, a second outer chain plate 2, a first inner chain plate 3, a second inner chain plate 4, a pair of rollers 5a and 5b, and a pair of pins 6a and 6b.

The dumbbell-shaped first outer chain plate 1 includes one straight waist portion disposed between two semi-circular end portions, an inner side 11 facing a sprocket when engaged formed with an incline 12 extending along an edge thereof, and holes 13a and 13b respectively formed in centers of the semi-circular end portions.

The dumbbell-shaped second outer chain plate 2 includes one straight waist portion disposed between two semi-circular end portions, an inner face 21 formed with an incline 22 extending along an edge thereof, and holes 23a and 23b respectively formed in centers of the semi-circular end portions.

The dumbbell-shaped first inner chain plate 3 includes one straight waist portion disposed between two semi-circular end portions, an inner face 31 formed with an incline 32 extending along an edge thereof, holes 33a and 33b respectively formed in centers of the semicircular end portions, and inward protuberant flanges 34a and 34b, respectively corresponding to the holes 33a and 33b, projecting from the inner face 31.

The dumbbell-shaped second inner chain plate 4 includes one straight waist portion disposed between two semicircular end portions, an inner face 41 formed with an incline 42 extending along an edge thereof, holes 43a and 43b respectively formed in centers of the semi-circular end portions, and inward protuberant flanges 44a and 44b, respectively corresponding to the holes 43a and 43b, projecting from the inner face 41.

The inner chain plates 3 and 4 are assembled with the flanges 34a and 44a aligning with each other and bearing the roller 5a, and with the flanges 34b and 44b aligning with each other and bearing the roller 5b.

The pin 6b is inserted through the holes 23b and 43b, flanges 44b and 34b, and holes 33b and 13b, so that one link of the chain is assembled. The pin 6a is employed to engage one link with another.

Figure 3:
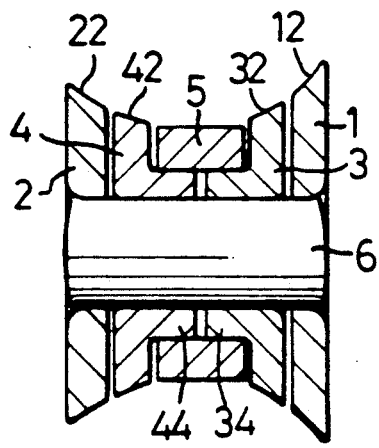
FIG. 3 is a cross-sectional view taken along line 3—3 in FIG. 1.

Referring to FIG. 3, the first outer chain plate 1 has a transverse dimension greater than that of the second outer chain plate 2, while the first inner chain plate 3 has a transverse dimension greater than that of the second inner chain plate 4.

Figure 4:
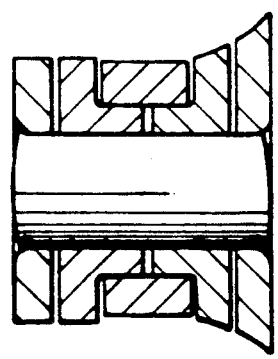
FIG. 4 is a cross-sectional view similar to FIG. 3, showing another embodiment of a chain in accordance with the present invention.

Referring to FIG. 4, there is shown a cross-sectional view of another embodiment of a chain in accordance with the present application. The second outer chain plate includes a transverse dimension equal to that of the second inner chain plate. An incline only extends along an upper rim and a lower rim of the straight waist portion of the second outer chain plate. An incline only extends along an upper rim and a lower rim of the straight waist portion of the second inner chain plate.

Figure 5:
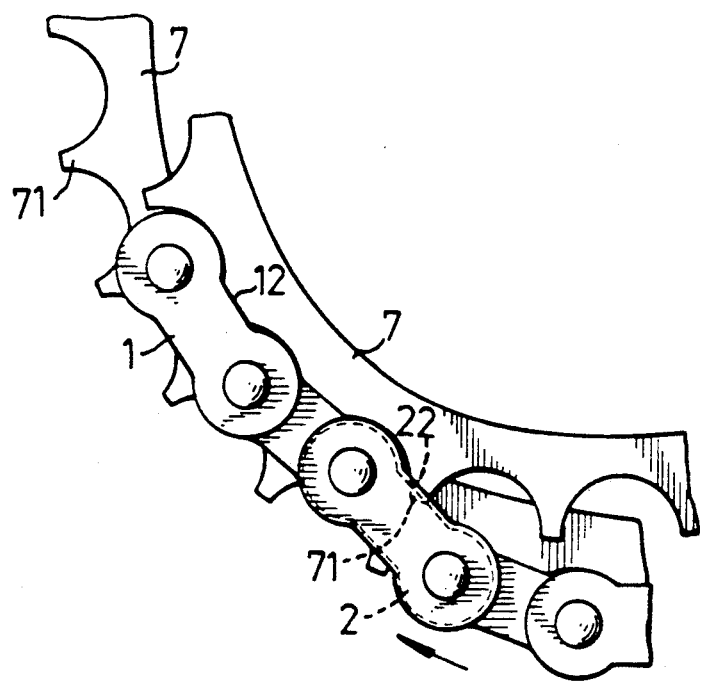
FIG. 5 shows a diagrammatic representation of a segment of a chain and rear sprockets while shifting up according to the present invention.

Referring to FIG. 5, when the rider shifts up on the rear free wheels 9, the chain is moved by a rear derailleur (not shown) away from the bicycle 70, e.g., from the front sprocket 91 to the front sprocket 92. The second outer chain plate 2 and the second chain plate 4 are employed. A tooth 910 smoothly slides relative to the link on the incline 22 or 42 and inserts into the space between the outer chain plates 1 and 3 or the space between the inner chain plates 2 and 4.

Figure 6:
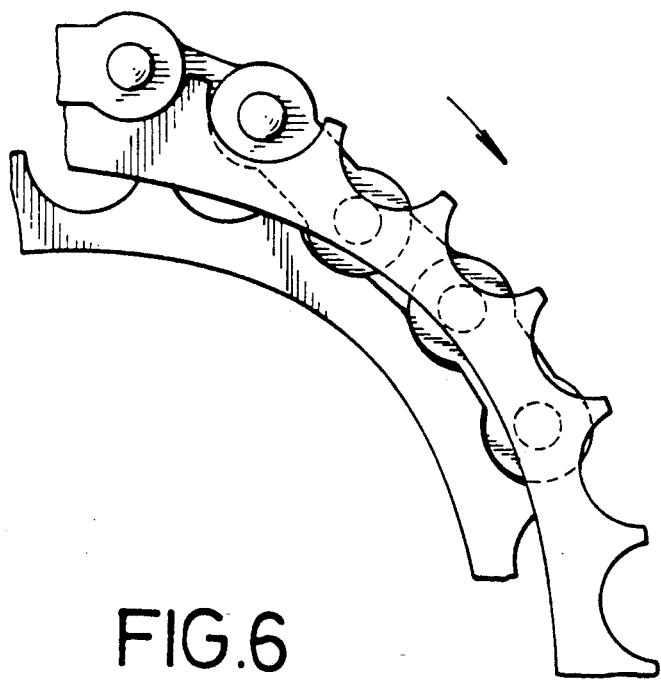
FIG. 6 shows a diagrammatic representation of a segment of a chain and front sprockets while shifting up according to the present invention.
Figure 7:
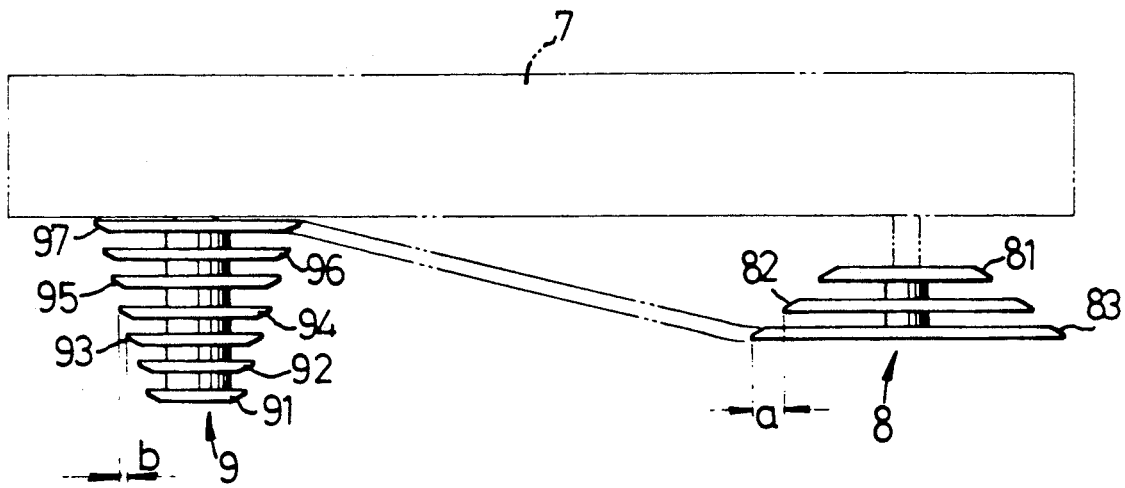
FIG. 7 is top view of front chain rings operatively connected with a rear free wheels by a chain.
Figure 8:
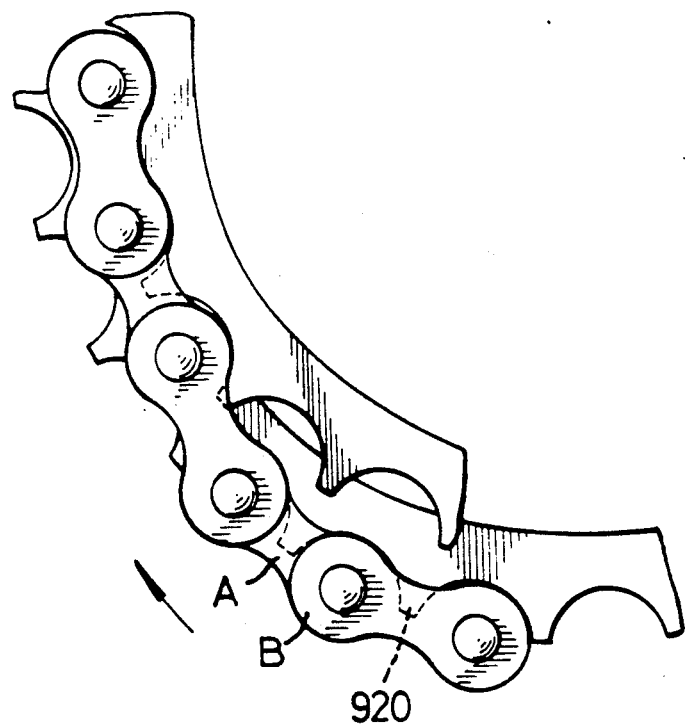
FIG. 8 shows a diagrammatic representation of a segment of a chain and rear sprockets while shifting up according to prior art.
Figure 9:
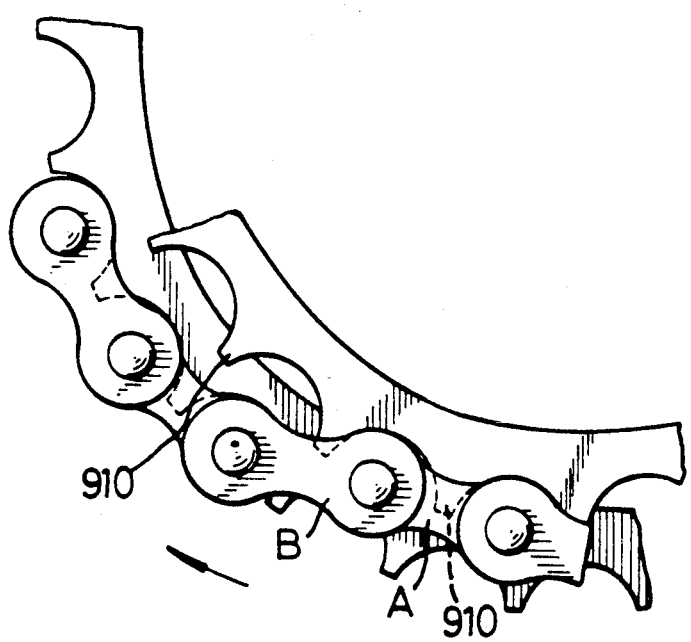
FIG. 9 shows a diagrammatic representation of a segment of a chain and front sprockets while shifting up according to prior art.
Figure 11:
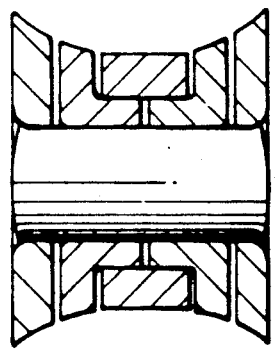
FIG. 11 is a cross-sectional view similar to FIG. 3, illustrating a chain according to the inventor's co-pending U.S. patent application Ser. No. 07/637,293, U.S. Pat. No. 5,066,265.
Figure 10:
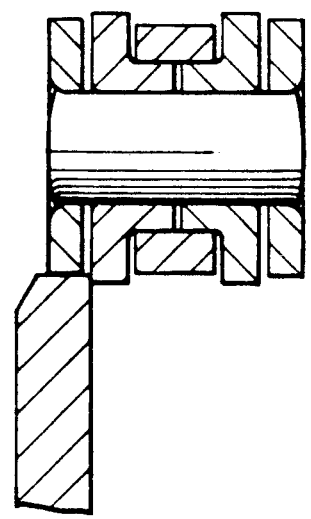
FIG. 10 is a cross-sectional view similar to FIG. 3, illustrating a chain according to prior art.

Referring to FIG. 6, when the rider shifts up on the front chain rings 8, the chain is moved by a front derailleur (not shown) away from the bicycle 70, e.g., from the front sprocket 81 to the front sprocket 82. The first outer chain plate 1 and the first inner chain plate 3 are employed to overcome the above-identified problem caused by the larger radial difference "b". A tooth 810 smoothly slides relative to the link on the incline 12 or 32 and inserts into the space between the outer chain plates 1 and 3 or the space between the inner chain plates 2 and 4.

Even though numerous characteristics and advantages of the present invention have been set forth in the foregoing description, the disclosure is illustrative only. Variations ma be made within the principles of the invention to the full extend as indicated by the broad general meaning of the claims.

I claim:

1. A chain comprising plural links each consisting of a first inner chain plate, a second inner chain plate, a first outer chain plate, and a second outer chain plate linked by rollers and pins, wherein the improvement comprises:

each chain plate including one straight waist portion disposed between two semi-circular end portions and an inner side facing a sprocket when engaged;
    said first outer chain plate including a transverse dimension greater than that of said second outer chain plate and that of said first inner chain plate, while said first inner chain plate including a transverse dimension no less than that of said second inner chain plate; and
    said inner sides of said first outer chain plate and said first inner chain plate each including an edge defining an incline extending along said edge of said inner side;

2. A chain as claimed in claim 1, wherein said incline of said first inner chain plate is positioned successively to said incline of said first outer chain plate as to form a smooth curved surface thereon at a junction thereof.

3. A chain in accordance with claim 1, wherein said second outer chain plate includes a transverse dimension no less than that of said second inner chain plate.

4. A chain in accordance with claim 3, wherein said second outer chain plate includes a transverse dimension equal to that of said second inner chain plate; and
    said inner sides of said second outer chain plate and said second inner chain plate each including an incline extending alone a top and a bottom of said straight waist.

5. A chain in accordance with claim 3, wherein said second outer chain plate includes a transverse dimension greater than that of said second inner chain plate; and
    said inner sides of said second outer chain plate and said second inner chain plate each including an edge defining an incline extending along said edge of said inner side.

6. A chain as claimed in claim 5, wherein said incline of said second inner chain plate is positioned successively to said incline of said second outer chain plate as to form a smooth curved surface thereon at a junction thereof.

7. A chain comprising plural links each consisting of a first inner chain plate, a second inner chain plate, a first outer chain plate, and a second outer chain plate linked by rollers and pins, wherein the improvement comprises:

each chain plate including one straight waist portion disposed between two semi-circular end portions and an inner side facing a sprocket when being engaged;
    said first outer chain plate including a transverse dimension greater than that of said second outer chain plate and that of said first inner chain plate, while said first inner chain plate including a transverse dimension no less than that of said second inner chain plate;
    said inner sides of said first outer chain plate and said first inner chain plate each including a rim defining an incline extending along said edge of said inner face; and
    said incline of said first inner chain plate is positioned successively to said incline of said first outer chain plate as to form a smooth curved surface thereon at a junction thereof.

8. A chain in accordance with claim 7, wherein said second outer chain plate includes a transverse dimension no less than that of said second inner chain plate.

9. A chain in accordance with claim 8, wherein said second outer chain plate includes a transverse dimension equal to that of said second inner chain plate; and said inner sides of said second outer chain plate and said second inner chain plate each including an incline extending alone an upper rim and a lower rim of said straight waists.

10. A chain in accordance with claim 8, wherein said second outer chain plate includes a transverse dimension greater than that of said second inner chain plate; and said inner sides of said second outer chain plate and said second inner chain plate each including a rim defining an incline extending therearound.

11. A chain as claimed in claim 10, wherein said incline of said second inner chain plate is positioned succesively to said incline of said second outer chain plate as to form a smooth curved surface thereon at a junction thereof.

* * * * *